(No Model.)
J. J. McDOWELL.
EGG BEATER.
No. 397,655. Patented Feb. 12, 1889.
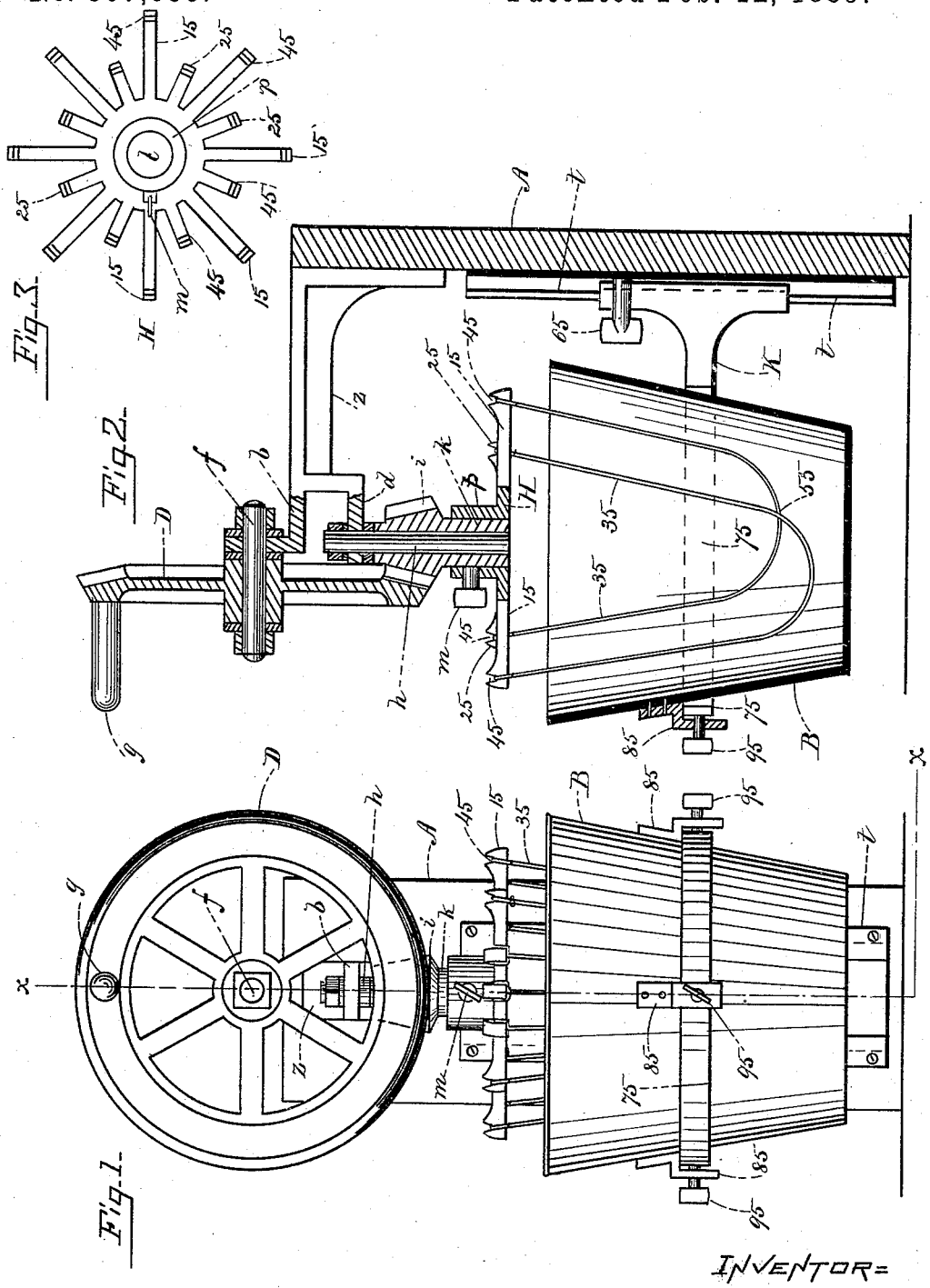
WITNESSES:
J. D. Matthews
E. M. Spinney
INVENTOR:
John J. McDowell,
PER C. A. Shawtlea,
ATTYS.

UNITED STATES PATENT OFFICE.

JOHN J. McDOWELL, OF BOSTON, MASSACHUSETTS.

EGG-BEATER.

SPECIFICATION forming part of Letters Patent No. 397,655, dated February 12, 1889.

Application filed July 12, 1888. Serial No. 279,712. (No model.)

*To all whom it may concern:*

Be it known that I, JOHN J. MCDOWELL, of Boston, in the county of Suffolk, State of Massachusetts, have invented a certain new and useful Improvement in Egg-Beaters, of which the following is a description sufficiently full, clear, and exact to enable any person skilled in the art or science to which said invention appertains to make and use the same, reference being had to the accompanying drawings, forming part of this specification, in which—

Figure 1 is a front elevation of my improved egg-beater in position for use; Fig. 2, a vertical transverse section of the same taken on line $x\,x$ in Fig. 1; Fig. 3, a top plan view of the beater-disk removed.

Like letters and figures of reference indicate corresponding parts in the different figures of the drawings.

My invention relates to that class of egg-beaters which is particularly adapted for use by confectioners, bakers, hotels, &c.; and it consists in certain novel features, as hereinafter fully set forth and claimed, the object being to produce a simpler and more effective device of this character than is now in ordinary use.

The nature and operation of the improvement will be readily understood by all conversant with such matters from the following explanation:

In the drawings, A represents the standard of the apparatus, and B the mixing pan or holder.

The standard A is preferably formed of wood, and is adapted to be secured in a vertical position to a wall or other convenient place. Secured by one end to the upper portion of the standard is a horizontally-arranged bracket, $z$, provided on its outer end with two arms, $b\,d$. A stub-shaft, $f$, is secured horizontally in the arm $b$, a large beveled gear, D, provided with a handle, $g$, being journaled on said shaft. A pendent shaft, $h$, is journaled in the arm $d$, a beveled pinion, $i$, being secured on said shaft in such a manner as to intermesh with the gear D, said pinion being provided with a downwardly-projecting hub, $k$.

The beater-disk H (see Fig. 3) is provided with a central hole, $l$, fitted to slide onto a hub, $k$, to which it may be secured by a thumb-screw, $m$, which passes through an annular flange, $p$, on said disk and engages said hub. The disk H is also provided with a series of radially-disposed long arms, 15, and a series of intermediate radially-disposed short arms, 25, all of said arms being provided at their outer ends with slots 45. The beaters or wires 35 are strung in the loops from the slots 45 in a short arm, 25, to the corresponding slots in an opposite long arm, 15, as best shown in Fig. 2, the loops being crossed or coming in contact with each other at 55, thus forming a net-work of wires, which greatly increases the effectiveness of the beater.

A vertically-arranged dovetail track, $t$, is secured to the face of the standard A, below the bracket $z$, and a horizontal bracket, K, has its inner end dovetailed to fit said track, on which it is vertically adjustable, being secured in any desired position by means of a thumb-screw, 65. The bracket K is also provided in its outer end with a circular loop, 75, adapted to receive and support the mixing pan or holder B, said pan being of any suitable shape or size and provided on its outer side with a series of lugs, 85, which rest upon the loop 75 and sustain the pan. Each lug 85 is provided with a thumb-screw, 95, which engages the rim of the loop 75 and prevents said pan from revolving therein when in use.

In the use of my improvement, the pan B, containing the eggs to be beaten, is disposed in the holder or loop 75, and the disk H secured on the hub $k$ of the pinion $i$, the bracket K being adjusted on the track $t$ so that the beaters 35 will pass downward sufficiently into said pan. By revolving the hand-gear D the disk H will be caused to rotate rapidly, and its wires or beaters 35 thrown outward against the sides of the pan by centrifugal force, thus thoroughly cutting and beating up the eggs.

Having thus explained my invention, what I claim is—

1. In an apparatus of the character described, the combination of the standard A, provided with the track $t$, the bracket K, fitted to slide on said track and provided with the holder or loop 75, the bracket $z$, secured to said standard and provided with the arms $b\ d$, the gear D, journaled in the arm $b$, and the pinion $i$, journaled in the arm $d$ and provided with the hub $k$, adapted to receive and revolve a beating or mixing disk when said gear D is rotated, substantially as set forth.

2. In an apparatus of the character described, the combination of the standard A, provided with the vertical track $t$, the bracket K, fitted to slide on said track and having the holder or loop 75, the pan B, provided with the lugs 85 and thumb-screws 95, the bracket $z$, secured to said body and provided with the arms $b\ d$, the gear D, journaled in the arm $b$, the pinion $i$, journaled in the arm $d$ and having the hub $k$, and the disk H, provided with the fingers 15 and 25 and looped wires 35, said disk being adapted to be detachably secured to said hub and revolved as the gear D is rotated, substantially as specified.

3. The disk H, provided with the long arms 15 and short arms 25, said arms being provided with slots or recesses 45, to receive the wires 35, and said wires respectively looped from the short arms to the opposite long arms, substantially as described.

JOHN J. McDOWELL.

Witnesses:
O. M. SHAW,
E. M. SPINNEY.